INVENTORS
JEAN ANDRE VILLE,
ROBERT GASTON BLONDE,
BY Haseltine Lake & Co
ATTORNEY Aug. 20, 1957 J. A. VILLE ET AL 2,803,702

SIGNAL DIFFERENCE CODED PULSE COMMUNICATION SYSTEM

Filed Oct. 9, 1953 3 Sheets-Sheet 3

United States Patent Office 2,803,702
Patented Aug. 20, 1957

2,803,702

SIGNAL DIFFERENCE CODED PULSE COMMUNICATION SYSTEM

Jean André Ville and Robert Gaston Blondé, Paris, France, assignors to Societe Alsacienne de Constructions Mecaniques, Paris, France Application October 9, 1953, Serial No. 385,194

Claims priority, application France October 13, 1952

4 Claims. (Cl. 178—43.5)

The present invention relates to pulse telecommunication systems, and more particularly to systems in which recurrent "bivalent" pulses are used, i. e. transmitted at periodically recurring times, wherein each pulse may assume either of two characteristic conditions hereinafter called "signalling conditions." These conditions may be characterized, for instance, by a positive or a negative polarity or by the fact that the pulses are effectively transmitted or not. It will be assumed, hereinafter, for facilitating the description, that these two conditions are characterized by the pulse polarities which will be called "positive pulses" and "negative pulses," but the invention is not restricted to this case since devices are known which make it possible to transform at will the characteristics of a sequence of pulses.

Communication systems are already known, wherein an information signal applied to a transmitting device, generally in the form of an electric voltage or current the instantaneous amplitude of which varies continuously between two predetermined limits, is transformed in said device into a sequence of bivalent pulses and then transmitted. At the receiving end, the receiving device reconstitutes a signal having a wave shape very close to that of the original information signal, by integrating the quantities of electricity brought successively by each pulse, generally by accumulating them in the form of a condenser charge. In an improved embodiment of these systems, the sequence of bivalent pulses is generated in the transmitting device by using an integrator identical with that of the receiver. This integrator is used for integrating locally the pulses already generated, thereby to produce a comparison signal, the coding, i. e. the choice of the characteristic condition of each new pulse generated being dependent on the operation of an amplitude comparator activated periodically at the recurrence frequency of said pulses and to which are applied, on the one hand, the instantaneous amplitude of the information signal, and, on the other hand, the comparison signal obtained by integration of the previously generated pulses. These systems have the drawback of requiring an extremely high pulse recurrence frequency which, in the case of commercial telephone transmission, is of the order of 60,000 per second. This is explained by reference to the now well known theory of information and considering not only that each pulse could not convey more than one elemental information but that, due to the statistic structure of the information signal to be transmitted, in other words its correlation in time, the successive pulses generated depend more or less on one another, and thus contribute only partly to the supply of new information.

The object of the present invention is to lower, for an equal quality in the reproduction of the transmitted signal, the repetition frequency of the pulses, which implies that the successive pulses can be made less dependent on one another than in already known systems. The present invention makes it possible to improve, for a given recurrence frequency of the pulses, the definition of the transmitted signal, i. e. to obtain a wave shape of the reconstituted signal closer to the wave shape of the original information signal than in already known systems.

The description of the invention will be facilitated by first defining certain notations and recalling some well known conventions used in symbolic calculus. The symbol "$t$" will apply hereinafter to a time variable and the instantaneous amplitude of the information signal to be transmitted will be designated by $S(t)$; a modified signal, derived from the above, as will be explained later, will be designated by $S_1(t)$; and $S_2(t)$ will designate a comparison signal obtained locally at the sending station by an operation effected on the sequence of transmitted pulses, the instantaneous amplitudes of which will be designated by $I(t)$, and this latter quantity may assume, as explained, only two values which may be, for instance $(+1)$ and $(-1)$; finally $S_3(t)$ is a signal reconstituted at the receiving station, from the pulses received. In accordance with the notations of symbolic calculus, we shall use the symbol of time differentiation $p$ equal to $j\omega$ in the case of a periodic signal for which $\omega$ is the angular frequency, $(j=\sqrt{-1})$ and which, more generally, is equivalent to the differential operator $$\frac{d}{dt}$$

With this notation, the mathematical time derivative of $S(t)$ will be represented symbolically by $pS(t)$.

In symbolic calculus, a common practice is to effect on any function of time $f(t)$ an operation represented symbolically by $$\frac{1}{p+a}$$

$a$ being a constant. This operation which consists in forming from $f(t)$ the function $$\frac{1}{p+a}(f(t))=e^{-at}\int_{-\infty}^{t} f(t)e^{at}dt$$

will be called, hereinafter, for short a "dissipative integration with a time constant equal to $$\frac{1}{a}\text{"}$$

Similarly, a device effecting the operation $(p+a)$ will be called hereinafter a differentiator with a time constant equal to $$\frac{1}{a}$$

Inasmuch as it is desired, in the present invention, to transmit the maximum possible information on the signal $S(t)$ to be transmitted for a given pulse recurrence frequency, and since the first order time derivative of any signal changes its algebraic sign more often than the signal itself, and its second order time derivative more often than the first order derivative, it would be interesting to transmit this second order time derivative intsead of the signal itself and correlatively to reconstitute the signal at the receiving station from two successive time integrations. This solution, however, is practically ruled out because the knowledge of the second derivative of a function determines that function only to the approximation of a linear time function. Thus, if coding were effected by first transforming the signal into its second derivative, and then sampling amplitudes in the form of pulses periodically on the second derivative, the signal reconstituted at the receiving station might differ largely from the original signal. To obviate this drawback a possible theoretical solution would consist in causing the transmission of pulses to depend on an immediate comparison made at the sending station between the transmitted pulses and a local comparison signal obtained by a double integration of the transmitted pulses, the transmission of said pulses being connected with the result of this comparison through the medium of a "return circuit" or electric servo-mechanism, effecting, as at the receiving station, two successive time integrations. A thorough theoretical study of such a system, however, shows that it would necessarily be unstable and would tend to set up self-oscillation. It is possible to effect such a theoretical study from considerations set forth in a book by Leroy A. MacColl, entitled "Fundamental Theory of Servomechanisms," edited by D. Van Nostrand Co. Inc., New York, 2nd edition, chapter X, pp. 88–101, which treats of the stability of servo-mechanisms operating by periodic samplings. This property may also be recognized in another way. In such a system, it is the second time derivative of the amplitude of the comparision signal which depends on the sign of the difference between this amplitude and that of the original signal. If at any instant, this difference assumes a value having a given algebraic sign, positive for example, the feedback effect existing in the system tends to give to the second derivative of the amplitude of the comparison signal an opposite sign, negative for example. Its first derivative may, nevertheless, preserve for a fairly long time the sign which it had at the instant of comparison, a positive sign for example, until the results produced by a sequence of indications giving a negative second derivative have accumulated sufficiently to reduce the magnitude of the first derivative and correct the difference. Consequently, there may exist in such a system undesirable oscillations having a fairly long duration relatively to the recurrence period of the comparisons and pulses. In a servo-mechanism comprising a single integration, on the contrary, such a drawback does not arise, because of its immediate action on the first time derivative of the comparison signal.

The method of the present invention is based on the above considerations, and it has for its object to reproduce to a good approximation, in the amplitude of the signal reconstituted at the receiving station, the values of the second order mathematical derivative of the amplitude of the original signal. The said method involves a double time integration at the receiving station, the desired similarity being obtained by providing at the transmitting station a simple integration in the feedback circuit or servo-mechanism used, and by carrying out at the said transmitting station, prior to the comparison effected by said servo-mechanism, a time differentiation modifying the wave shape of the original signal.

The integrations used in said method are "dissipative integrations" according to the definition given above, and they are effected with finite time constants, the values of which will be made clearer later. The use of pure integrations, besides the fact that they are difficult to effect in practice, would lead to systems preserving for a uselessly long time the memory of previous conditions.

According to the present invention, a telecommunication method is provided for an information signal in the form of an electric voltage or current having an instantaneous amplitude represented by a function $S(t)$ of time $t$, using periodically recurrent coded electric pulses with a recurrence frequency F, said pulses having individually two different possible signalling conditions. The instantaneous amplitude $S_1(t)$ of a modified signal derived from the information signal to be transmitted is compared periodically, with a frequency F, in a transmitting station, with the instantaneous amplitude $S_2(t)$ of a comparison signal generated locally from pulses transmitted at said station. The coding of said pulses having an instantaneous amplitude $I(t)$ is effected according to the result of said comparison. A reconstituted signal $S_3(t)$ is obtained from pulses received at a receiving station through a transmission circuit and is finally applied to a utilization circuit. In accordance with the notations of symbolic calculus, by designating by the symbol $p$ a time differentiation operator, by $T_1$ and $T_2$ two time constants, and by $$\frac{1}{1+pT}f(t)$$

the result obtained by carrying out on a time function $f(t)$ the operation represented by the expression:

$$\frac{1}{T}e^{-t/T}\int_{-\infty}^{t} f(t)e^{t/T}dt$$

the present invention is characterized by a modified signal $S_1(t)$ equal to $(1+pT_1)S(t)$, a comparison signal $S_2(t)$ equal to $$\frac{1}{1+pT_2}I(t)$$

and a reconstituted signal $S_3(t)$ obtained at the receiving station, by effecting on the instantaneous amplitudes $I(t)$ of the received pulses the operation represented by the expression:

$$\frac{1}{1+pT_1}\times\frac{1}{1+pT_2}I(t)$$

The present invention also provides a telecommunication system for an information signal in the form of an electric voltage or current using periodically recurrent coded electric pulses having individually two different possible signalling conditions, and including a transmitting station comprising a differentiating circuit at the input to which the information signal is applied and delivering a modified signal at its output, an amplitude comparator made periodically active under the action of a generator of periodic pulses and comprising two inputs, fed respectively by the said modified signal and a comparison signal and delivering at its output a control signal depending on the result of each comparison, the said control signal controlling a generator of coded pulses the output of which feeds into a transmission circuit and into the input to an integrator circuit the output of which gives said comparison signal, and a receiving station comprising a first and a second integrator circuit connected in series and having different time constants, the pulses received through said transmission circuit being applied to the input to said first integrator and a reconstituted signal being received at the output from said second integrator to which a utilization circuit is connected.

Other characteristics and objects of the invention will appear from the following description, with reference to the appended drawings, wherein.

Hereinafter the information signal to be transmitted, assumed as consisting in an electric voltage with a magnitude represented by a function $S(t)$ of time $t$, will be supposed to be uni-directional, i. e. $S(t)$ is supposed to be always of the same algebraic sign, positive for instance, which does not limit the generality of application of the system, as any variable voltage can always be converted into a unidirectional voltage by adding a constant voltage of a suitably chosen magnitude.

Figure 1:
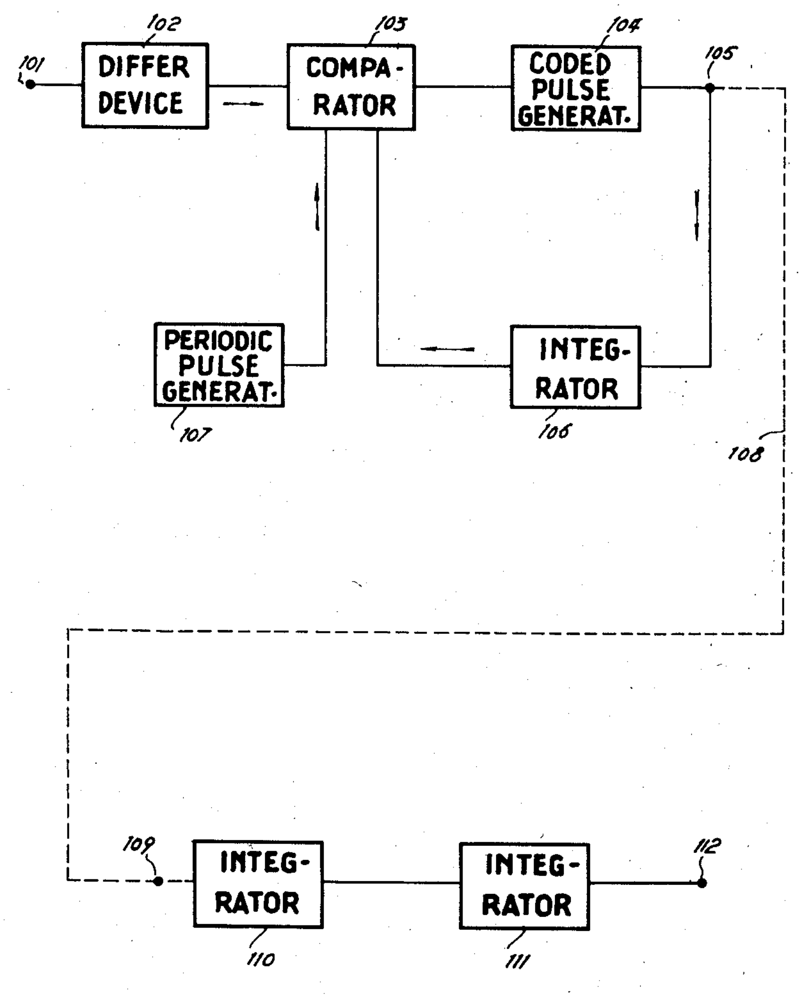
Figure 1 illustrates in simplified form the diagram of a transmission system according to the invention.

In Figure 1, at the transmitter, the information signal to be transmitted $S(t)$ is applied at 101 to the input of a differentiating device 102 having a time constant $T_1$ and which delivers, at its output, a modified signal $S_1(t)$ which is applied to the input of an amplitude comparator 103 the operaiton of which is periodically controlled by a periodic pulse generator 107, operating at a frequency F, said comparator 103 being also supplied with the comparison signal $S_2(t)$ obtained at the output from an integrator device 106 supplied with the pulses $I(t)$ issuing at 105 from a coded pulse generator 104 controlled by a signal supplied periodically at each comparison by the output from the comparator 103. Point 105 is also connected with a transmission line 108 represented by a dotted line leading to the input to a receiver at 109, which comprises two integrator devices 110, 111 having time constants $T_1$ and $T_2$ and which are connected in series, the input to the first one 110 being supplied with the pulses received at 109 through the transmission line 108, and the output from the second one feeding at 112 a utilization circuit not shown on the drawing.

As seen in Figure 1, the differentiator circuit 102 has the same time constant $T_1$ as the transmitter and it may be considered as having the function of effecting a certain "extrapolation" in time (prediction) of the signal, by adding thereto an amount proportional to its mathematical derivative before applying it to the comparator 103. This extrapolation can be accurate only if it is effected over a short time interval. If $F_0$ is the width of the frequency band occupied by the signal $S(t)$ to be transmitted, it is known that amplitudes sampled at time intervals equal to $$\frac{1}{2F_0}$$

are independent. $T_1$ therefore, should be less than $$\frac{1}{2F_0}$$

According to a secondary feature of the invention, the time constant $T_1$ of the differentiator stage at the sending end, as well as that of the corresponding integrator stage at the receiving end, will be chosen preferably equal to a fraction less than ½ the reciprocal of the band width of the information signal to be transmitted: for instance, $T_1$ may be taken equal to $$\frac{1}{4F_0}$$

The repetition frequency F of the bivalent pulses used for the transmission of the signal should be large with respect to 2F so that a sufficient number of pulses ensure the transmission with a sufficient accuracy of the magnitude of each of the instantaneous amplitude sampled out of the signal. It is known that one may take, for instance, a pulse recurrence frequency of $F=10.F_0$.

The integration circuit 106 effecting the operation $$\frac{1}{1+pT_2}$$

should be capable of integrating successively a number of consecutive pulses and consequently should be little different from a pure integrator (effecting the operation $1/p$). Some damping should be preserved, however, to eliminate the effect of remote past values. This is the reason why this stage should be designed to effect the operation represented symbolically by $$\frac{1}{1+pT_2}$$

the time constant $T_2$ of the integrators corresponding to the transmitting and receiving ends being preferably equal to a low multiple of the time interval $1/F$ between two pulses, and one may take for instance $T_2=5/F$.

Figure 2:
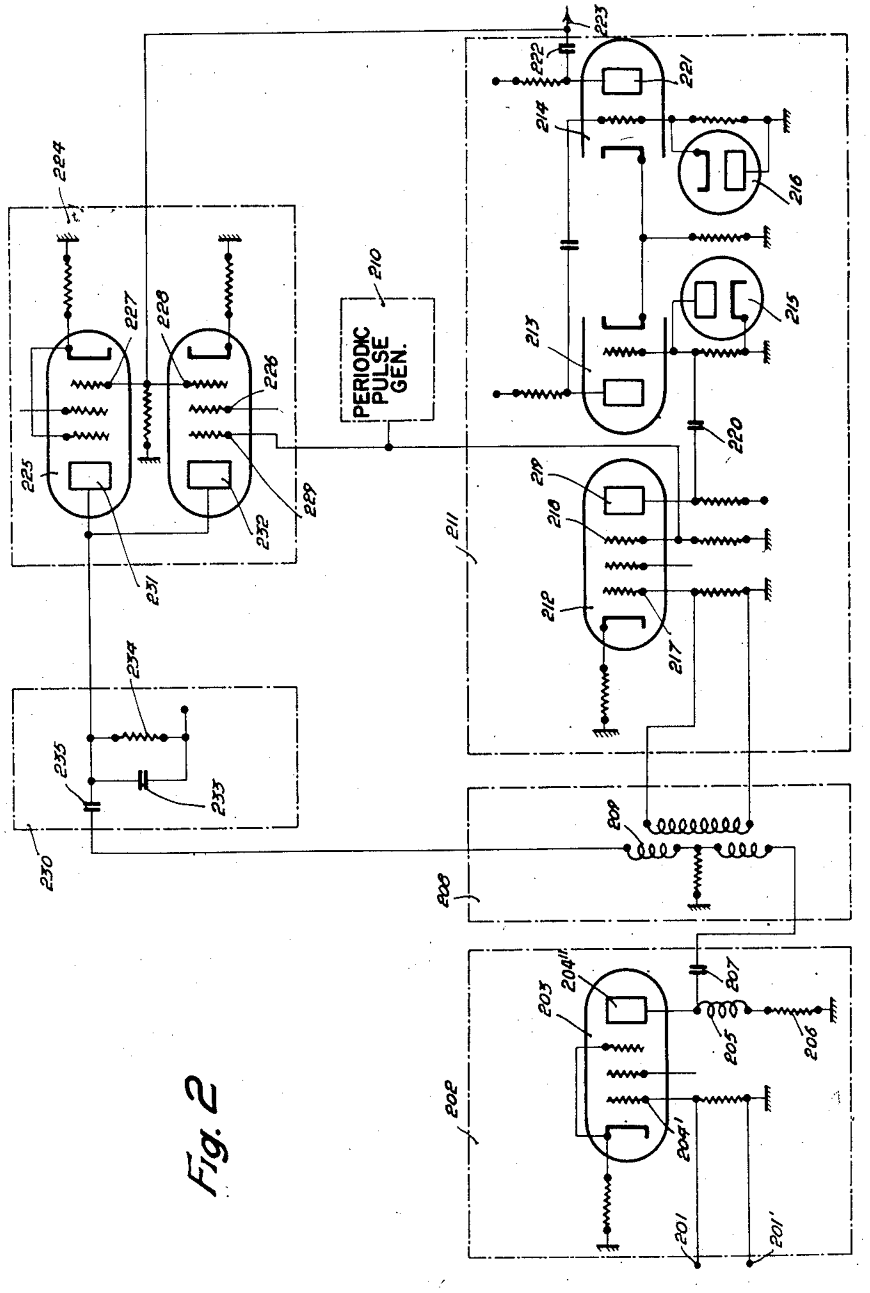
Figure 2 is a wiring diagram of an embodiment of a transmitter according to the invention.

In Figure 2, the signal to be transmitted arrives at terminals 201 and 201' and is fed to a differentiation device 202 comprising essentially a pentode tube 203. The conventional power supply sources for the electrodes of the tube 203 and of the other tubes of the device have not been shown in the drawing. The signal to be transmitted is applied to the control grid 204' of the tube 203, the plate or anode 204'' of which is connected to an inductance 205 with a value L and a resistance 206 with a value R connected in series therewith. The voltage at the terminals of these two elements 205 and 206 is taken from the output of the assembly 202 through the connecting condenser 207.

A comparator 208 performs the function of element 103 of Fig. 1, and it comprises essentially a transformer 209 with two primary half-windings and a secondary winding.

A unipolar periodic pulse generator 210 of any known type, with a frequency F feeds a pulse shaping device 211 of a well known type comprising a first stage with a pentode tube 212 and an amplitude selector stage comprising two triode tubes 213 and 214 in cathode-coupled multivibrator connection and two diode tubes 215 and 216. The purpose of the device 211 is to transform the control signals issuing from comparator 208 into pulses suitable for application to a transmission circuit.

The tube 212 is actuated through its control grid 217 by the voltage supplied by the comparator 208 and through its screen-grid 218 by pulses supplied by the pulse generator 210. The pulses sampled at its anode 219 through a connecting condenser 220 are applied to the amplitude selector stage comprising tubes 213 and 214 and the shaped pulses are obtained from the anode 221 of the tube 214 through the connecting condenser 222.

The pulses issuing from the shaping device 211 are applied between the connection 223 and a constant potential point called "ground" hereinafter, and directed through suitable accessory elements towards a transmission circuit, not shown, and towards the corresponding receiver.

The element 224 in Figure 2 represents a pulse transformer which transforms the pulses delivered by the shaper 211, which are unipolar, i. e., existing or not, into constantly existing but bi-polar pulses. It is of a known type and comprises essentially two pentode tubes 225 and 226 actuated in parallel through their grids 227 and 228 by unipolar pulses. The tube 226 is further actuated by its suppressor grid 229 by the pulses delivered by generator 210.

An integrator device 230 performs the function of element 106 of Fig. 1. The bipolar pulses supplied by transformer 224, taken from the ganged anodes 231 and 232 of the tubes 225 and 226 are fed to the integrator device 230 which comprises essentially a condenser 233 with a capacity C' and a resistance 234 having a value R'. The integrated pulses taken from the terminals of condenser 233 and resistance 234 are applied, through a connecting condenser 235, to the transformer 209 of the comparator 208.

The device as described operates a follows:

Let $S(t)$ be an electric voltage applied to terminals 201—201'. Calling G the transconductance of the tube 203, the output voltage $S_1(t)$ received at 207 taken at the terminals of the resistance 206 and inductance 205 in series in the anode circuit has, as a symbolic expression:

$$S_1(t)=G\left(R+L\frac{d}{dt}\right)S(t)=GR(1+pT_1)S(t)\left(\text{letting } \frac{L}{R}=T_1\right)$$

Such a device therefore does effect, except for a numerical factor GR, the mathematical operation represented by the symbol $(1+pT_1)$, the time constant of the assembly having a value $$T_1=\frac{R}{L}$$

The signal thus treated is applied to the comparator 208 which receives respectively, in the two half windings of the primary of its transformer 209, on the one hand the signal $S_1(t)$ derived as just explained, and on the other hand a signal $S_2(t)$ the generating of which will be explained later. There is obtained in the secondary winding of 209 a voltage having a polarity of the same sign as the largest voltage applied to the two primary half-windings.

The tube 212 of the shaper 211 acts as a selector according to a known principle. The anode current of tube 212 can exist only if a positive voltage is applied both to its control grid and to its screen grid. The result is that this tube can transmit only the pulses generated in a recurrent manner by the pulse generator 210, but it will transmit effectively only those pulses which occur when the voltage delivered by the comparator 208 is positive, i. e., when one of the two voltages applied to the halfwindings of 209 is higher than the other. It will be assumed, for instance, which depends only on the directions of the windings in 209, that it is integrated voltage supplied by integrator 230 which is higher than the signal delivered by differentiator 202.

When the pulses go through the tube 212, they are amplified and shaped in the shaper stage 211 which is of a known type and the operation of which need not be described for an understanding of the invention. Shaper 211 delivers at 223 pulses having a negative polarity and and actually rectangular wave shape.

These pulses, all of negative polarity but intermittently present or absent, are directed on the one hand by connection 223 towards the transmission circuit and the receiver, and on the other hand to the pulse transformer 224 which is also of a conventional type, and which delivers to the integrator 230 pulses which are always present but with a polarity which is intermittently positive or negative. The negative pulses go through the tube 225, while in the tube 226 they neutralize the effect of the positive pulses applied to the screen grid 229 of said tube. When the negative pulses do not exist, the pulses supplied by the pulse generator 210, assumed positive, go through the tube 226.

The variable polarity pulses thus generated are applied to the resistance 234 and condenser 233 in parallel, the equivalent impedance of which, at the angular frequency $\omega$, and assuming $p=j\omega$, is expressed by $$Z=\frac{R'/jC'\omega}{R'+1/jC'\omega}=\frac{1}{C'}\frac{1}{j\omega+1/R'C'}=\frac{R'}{1+C'R'p}$$

The tubes 225 and 226 supply rectangular anode current pulses the peak values of which are proportional to the transconductance of tubes 225 and 226 assumed to have quite identical characteristics with respect to the peak voltages of the pulses applied to them respectively, and the voltage obtained at the terminals of condenser 223 and resistance 234, being proportional to the anode current and to Z, is proportional to $$\frac{1}{1+C'R'p}$$

which expresses the fact that the pulses are "integrated," said integration being combined with the action of a time constant having a value $T_2=C'R'$. The pulses thus integrated are applied to the comparator 208 as explained above.

Where the signal $S(t)$ to be transmitted is a voice frequency signal in which the effective frequency band is made of frequencies lower than 3000 C. P. S., amplitudes separated in time by 1/6,000 of a second may be considered as independent. The recurrence frequency of the pulses delivered by the pulse generator 210 will be chosen much higher than 6,000 C. P. S., for instance 40,000 C. P. S.

At the output 207 of the differentiator 202 where the signal $S(t)$ is modified by differentiation in proportions characterized by the time constant $T_1$, the comparator 208 permanently compares the signal $S_1(t)$ thus modified and a local comparison signal $S_2(t)$ obtained from integrator 230 with a time constant $T_2$ from the pulses delivered by the device 211 in a stable feedback circuit.

The selector tube 212 of the pulse shaper 211 puts in evidence the instantaneous difference between the amplitudes of the modified signal and of the integrated signal at those instants when it is made active by the pulses delivered by the pulse generator 210. This tube is traversed by an anode current pulse and it causes the transmission through 212 and 213 towards the receiver of a pulse of a negative polarity when the instantaneous value of the integrated comparison signal is larger than that of the modified signal. This negative pulse will have the effect of causing the disappearance of the momentary excess of the comparison signal. The same negative pulse returning in the transmitter goes through the pulse transformer 224 and is integrated by the integrator 230 with a time constant $T_2$, and the variable voltage created by this integration is transmitted to the comparator 208 so as to help in causing the disappearance of the momentary excess of the integrated signal over the modified signal.

If, on the contrary, at the time of the production of a pulse by generator 210, the amplitude of the modified signal is largest in the comparator 208, the pulse issuing from comparator 208 will not go through the shaper 211 and will not be sent at 223 towards the transmission circuit to the receiver. But in the feedback circuit 224, 230, the positive pulse delivered by generator 210 will be able to pass through the pulse transformer 224 and will be integrated by integrator 230, and the variable voltage created by this integration will be transmitted to the comparator 208 and will contribute to the increase in the comparison signal which had momentarily a smaller amplitude than the modified signal.

Figure 3:
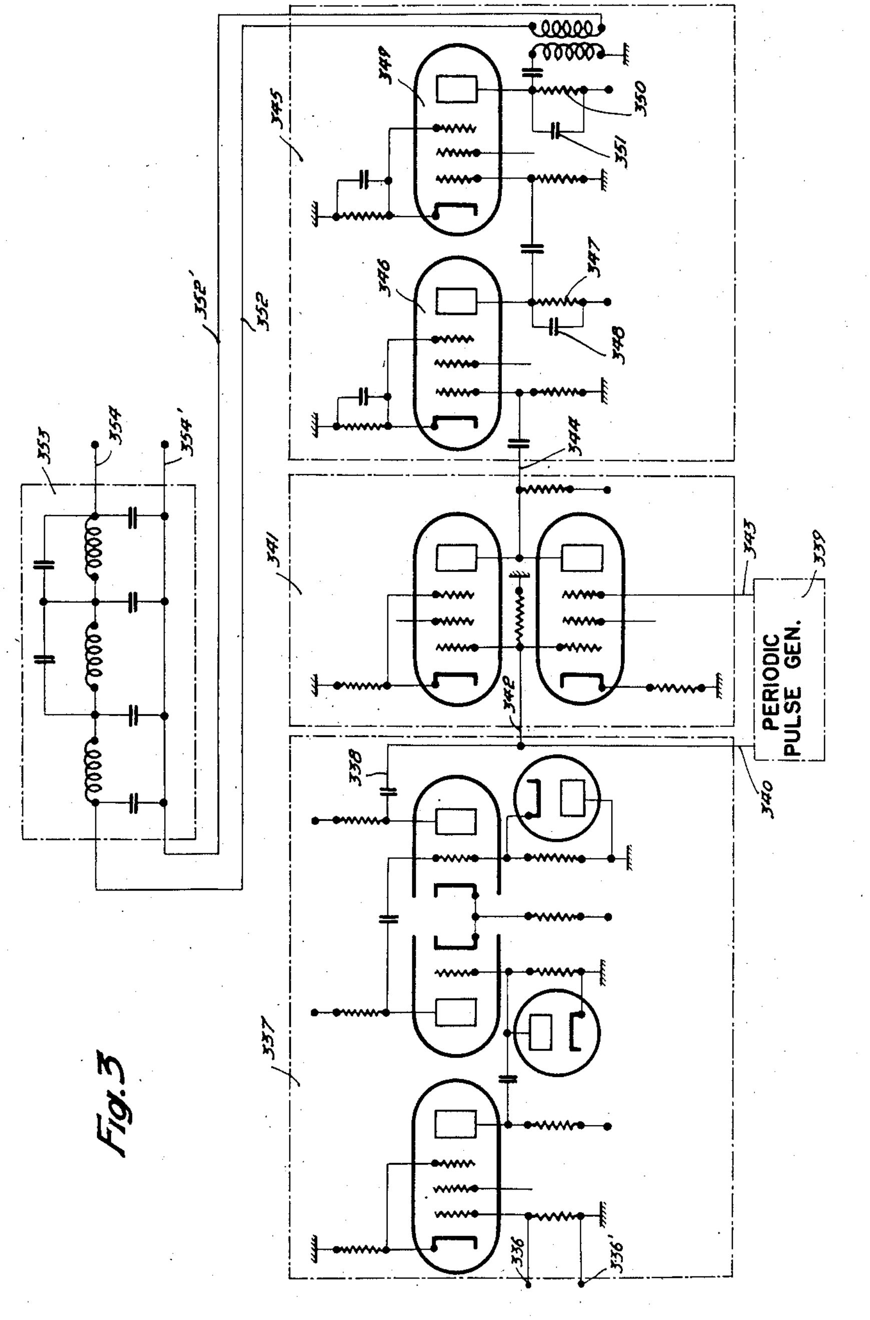
Figure 3 is a wiring diagram of one embodiment of a receiver according to the invention.

Figure 3 shows, also reduced to its essential elements, a receiver according to the invention, wherein the input terminals 336—336' through which the pulses arrive may be of positive or negative polarity. These pulses which are possibly distorted by transmission are fed to a pulse shaper 337 of a known type and identical with that used in the transmitter shown in Figure 2 which delivers at 338 pulses with a truly rectangular wave shape.

A recurrent pulse generator 339 supplies pulses, all having the same polarity and the frequency of which is assumed to be controlled by that of the received pulses. The controlling device, which may be of any known type, has not been shown, but the connection 340 represents the channel by which the shaped received pulses are applied as actuating pulses to the synchronizing device of the pulse generator 339, of whatever type it may be.

A pulse transformer 341 of a known type and identical with that used in the transmitter is actuated through 342 by the shaped received pulses and through 343 by the pulses from the local generator 339. There are obtained at 344 pulses with a rectangular wave shape and the polarity of which may be positive or negative.

A two-stage integrator 345, each stage being similar to the integrator of the transmitter, comprises in the anode circuit of a pentode tube 346, a condenser 347 with a value $C_1$ and a resistance 348 with a value $R_1$, and, in the anode circuit of a pentode tube 349, a condenser 350 with a value $C_2$ and a resistance 351 with a value $R_2$.

The pulses integrated twice are collected at terminals 352—352' and are applied to a low pass filter 353. The signal obtained at the output terminals 354—354' is the reconstituted signal $S_3(t)$ which may be transmitted through any desirable accessory elements, to a utilization element also of any type.

The above described device operates as follows:

Pulses from a transmitter like the one illustrated in Figure 2, i. e. bivalent recurrent pulses, characterized by their effective presence or absence, are received at terminals 336—336' of the receiver.

The shape of these pulses having been altered during their transmission, they are shaped in the pulse shaper 337 which restores at 338 pulses having a truly rectangular shape. The transformer of unipolar pulses into bipolar pulses 341 restores at 344 pulses which are always present and have either a positive or negative polarity.

The negative pulses corresponding to the pulses received which are effectively present are transmitted through one tube of the pulse transformer and the positive pulses correspond to the absent pulses; the latter are supplied by the local pulse generator 339 synchronized by the received pulses (and preserving this synchronism for the duration of the absent pulses) and go through the second tube of the pulse transformer.

These pulses of variable polarity are integrated twice by the two-stage integrator 345. The tubes 346 and 349 accessorily amplify the integrated pulse and the voltages obtained in the anode circuit of each tube, at the terminals of a circuit comprising a condenser 348 or 351 and a resistance 347 or 350 in parallel, result, as explained for the transmitter, from two successive "dissipative" integrations, the time constant for each of them being equal to the product of the capacity by the resistance. These time constants thus have the respective values:

$$T_1 = R_1C_1 \qquad T_2 = R_2C_2$$

$R_1C_1$ and $R_2C_2$ may be so dimensioned that $T_1$ and $T_2$ have substantially the same values as the quantities designated by the same notations in the transmitter. The integrator restores at 352—352′ a signal for which it can be shown that the wave shape is that of a curve consisting of a series of arcs, a signal portion in the shape of a parabolic arc being generated by the integrator assembly after each pulse and the direction of curvature of said arc depending on the polarity of the pulse, in such a manner that a positive pulse will cause at 352—352′ a voltage having an increasing first time derivative while a negative pulse causes a voltage having a decreasing first time derivative.

The wave shape of the reconstituted variable signal $S_3(t)$ is close to that of the original signal $S(t)$ but contains, nevertheless, frequency components outside the spectrum of said signal; thus the reconstituted signal is made to pass through a filter 353, the band-width of which corresponds to that of the original signal to be transmitted, for instance 3000 C. P. S. in the case of a telephone signal transmission, and the finally reconstituted signal is obtained at 354—354′.

According to a secondary characteristic of the invention, the time constants $T_1$, $T_2$ will preferably be given values only slightly different from those used in the transmitter.

What is claimed is:

1. In a communication system in which an information signal voltage is sampled for its instantaneous amplitude at recurring time instants and thereafter translated into recurring coded pulses each of which has one or the other of two possible signalling conditions, a sending device comprising a time differentiator device including first and second electron tubes each having a cathode, at least one control grid and an anode, means for applying said signal voltage to said control grid, an impedance consisting of an inductance in series-connection with a resistance and inserted in the anode circuit of said first tube, a differential transformer having first and second primary half-windings and a secondary winding, means for applying voltage developed across said impedance to said first primary half-winding; a generator of periodic pulses, means for applying voltage developed across said secondary winding to a control grid of said second electron tube, means for applying pulses from said generator of periodic pulses to a control grid of said second tube so as to render it periodically operative; a further impedance inserted in the anode circuit of said second electron tube; a coded pulse generator controlled by amplified voltage received across said further impedance and delivering coded pulses of one or the other of two possible signalling conditions according to the instantaneous value of said amplified voltage; a pulse converter; means for applying pulses from said coded pulse generator to said pulse converter; said pulse converter delivering pulses of constant amplitude but having one of two opposite polarities according to the signalling condition of said coded pulses; an integrator device including an amplifier periodically rendered operative by pulses from said coded pulse generator and supplying a charging voltage to an integrating condenser; means for applying voltage developed across said condenser to said second primary half-winding of said differential transformer; and means for impressing said coded pulses from said coded pulse generator upon said transmission circuit.

2. A sending device as claimed in claim 1, in which said first tube is a pentode tube.

3. A sending device as claimed in claim 1, in which said second tube is a pentode tube and is periodically rendered operative by pulses from said periodic pulse generator applied to the suppresor grid of said second tube.

4. A sending device as claimed in claim 1, in which said coded pulse generator consists of a pair of triode tubes in multivibrator connection and is controlled by said amplified voltage reecived across said further impedance applied to the control grid of one of said triode tubes.

References Cited in the file of this patent

UNITED STATES PATENTS

| | | |
|---|---|---|
| 2,530,538 | Rack | Nov. 21, 1950 |
| 2,605,361 | Cutler | July 29, 1952 |
| 2,659,856 | Gannaway | Nov. 17, 1953 |